No. 770,631. PATENTED SEPT. 20, 1904.
A. C. EASTWOOD.
MOTOR CONTROLLING SYSTEM.
APPLICATION FILED JUNE 10, 1904.
NO MODEL. 5 SHEETS—SHEET 1.
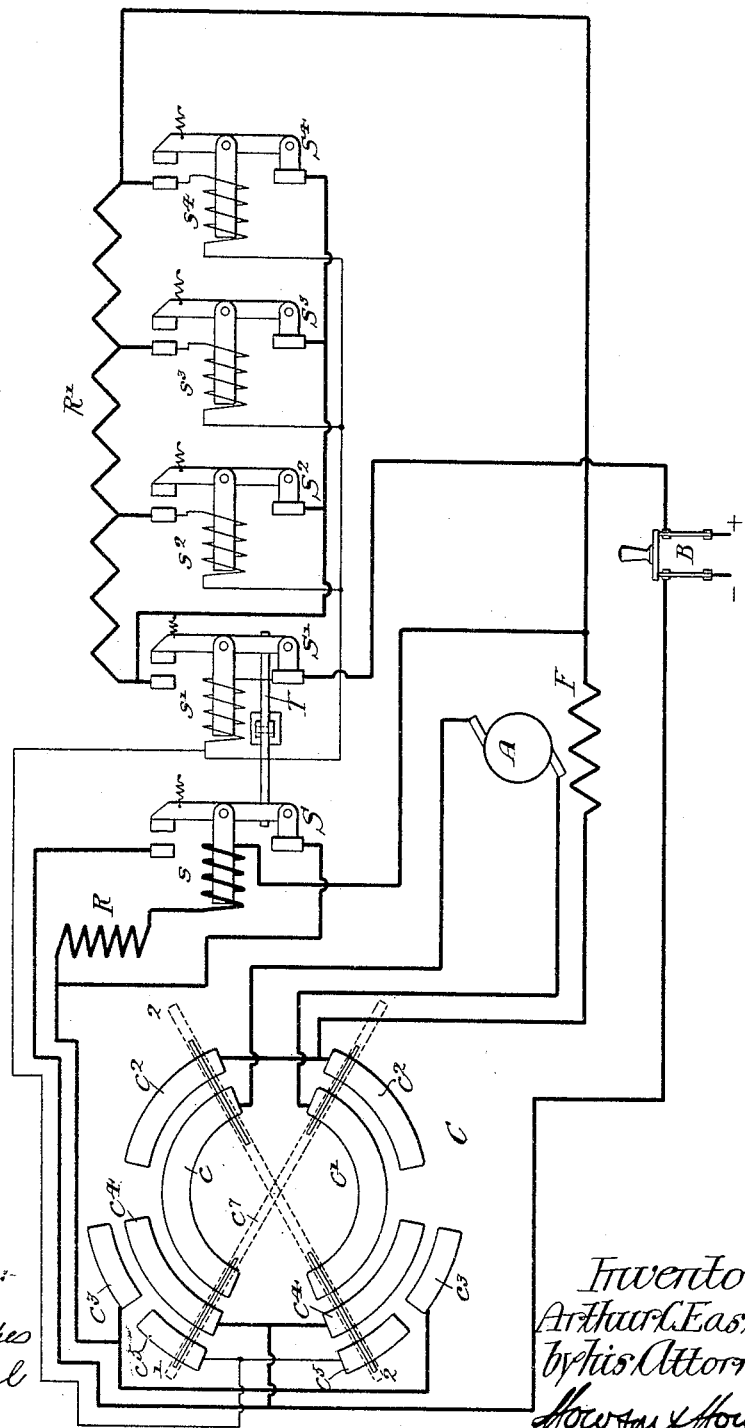

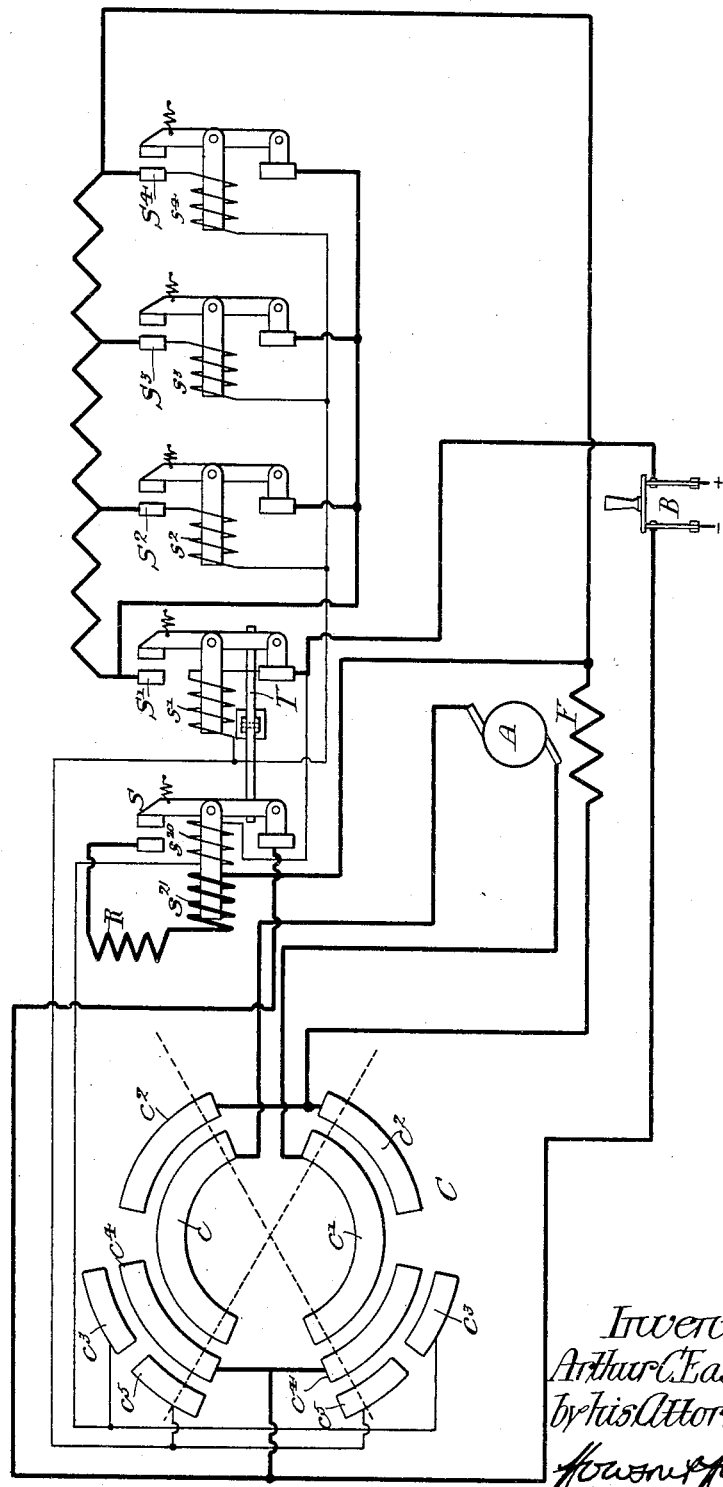

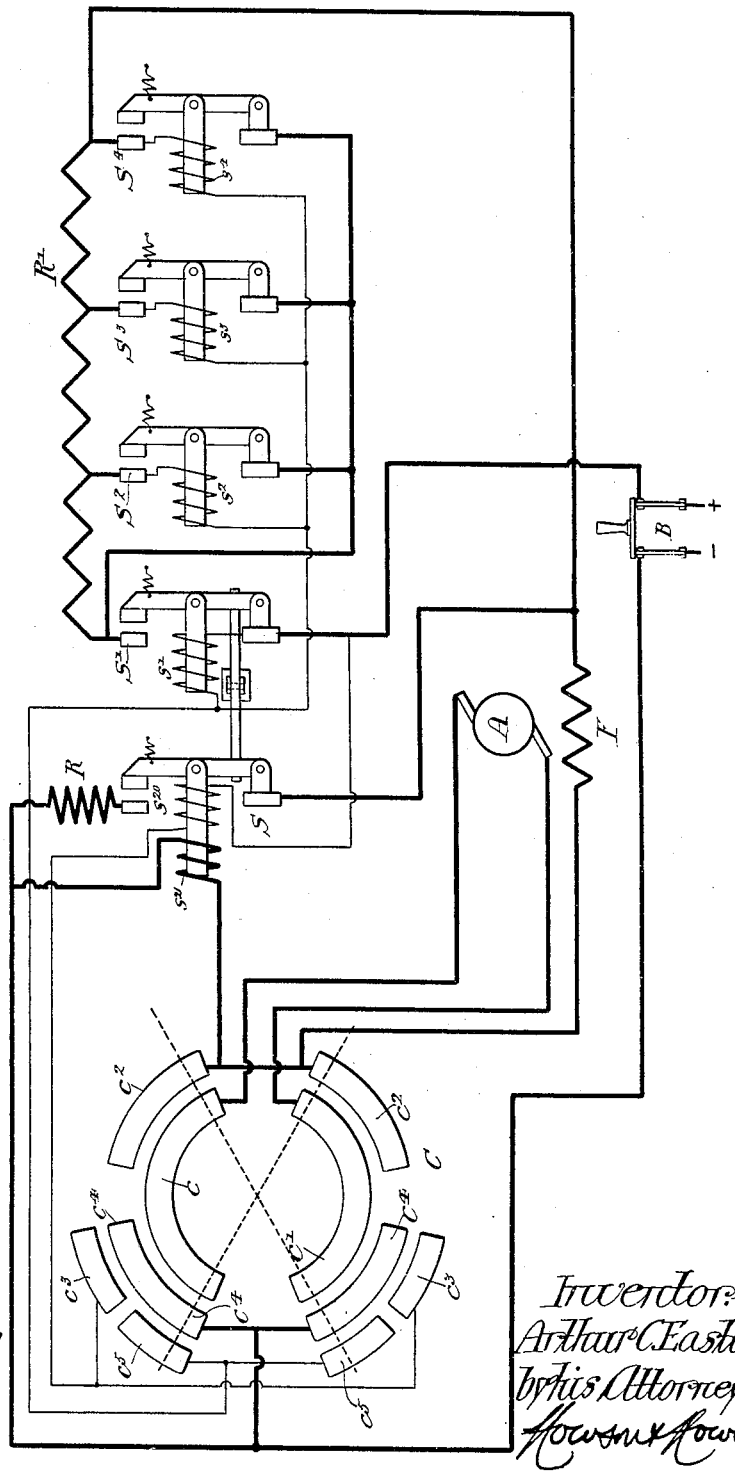

No. 770,631. PATENTED SEPT. 20, 1904.
A. C. EASTWOOD.
MOTOR CONTROLLING SYSTEM.
APPLICATION FILED JUNE 10, 1904.
NO MODEL. 5 SHEETS—SHEET 4.
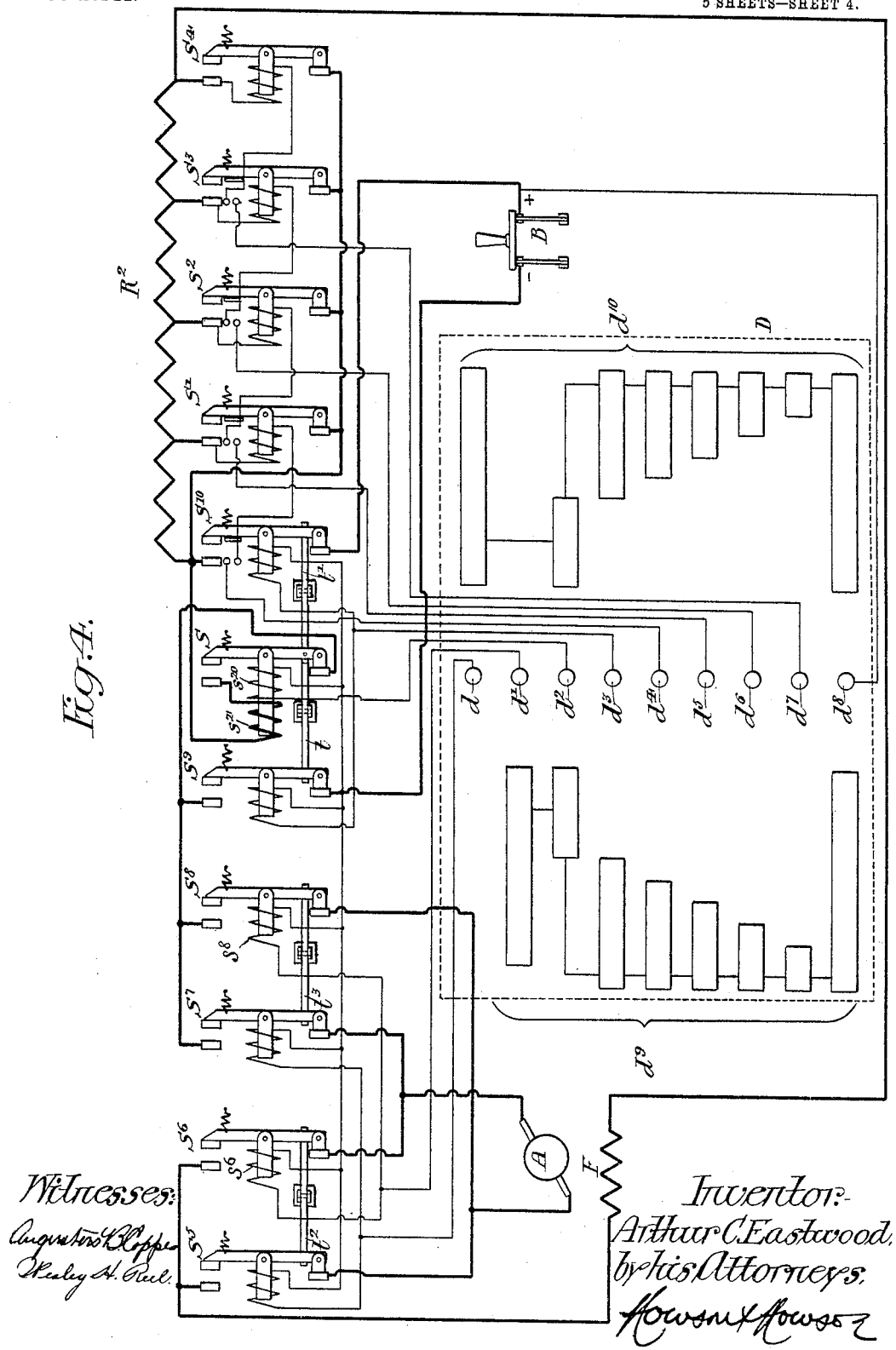
Witnesses:
Inventor:-
Arthur C. Eastwood,
by his Attorneys

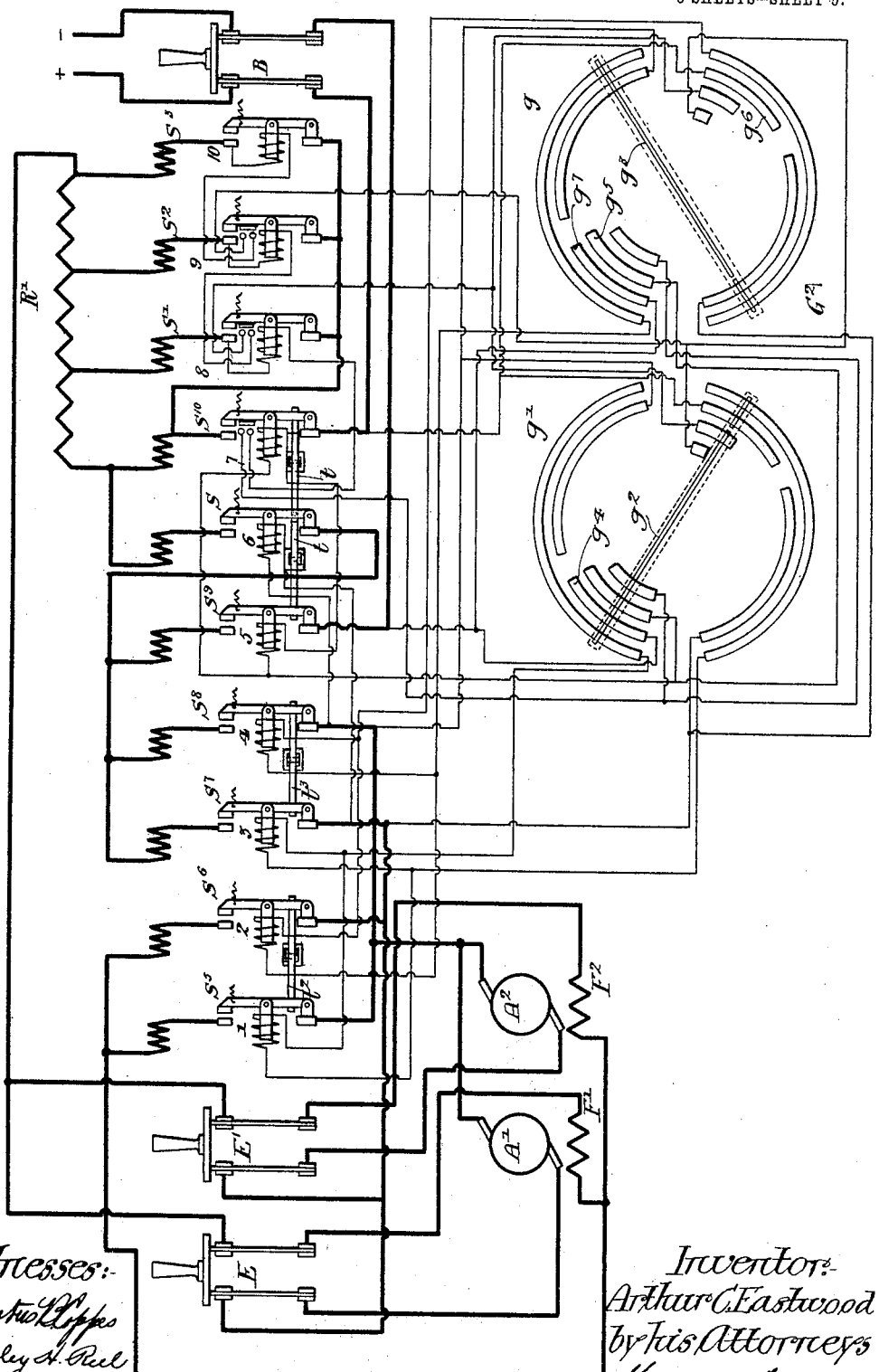

No. 770,631.

Patented September 20, 1904.

UNITED STATES PATENT OFFICE.

ARTHUR C. EASTWOOD, OF CLEVELAND, OHIO.

MOTOR-CONTROLLING SYSTEM.

SPECIFICATION forming part of Letters Patent No. 770,631, dated September 20, 1904.

Application filed June 10, 1904. Serial No. 212,021. (No model.)

*To all whom it may concern:*

Be it known that I, ARTHUR C. EASTWOOD, a citizen of the United States, residing in Cleveland, Ohio, have invented certain Improvements in Motor-Controlling Systems, of which the following is a specification.

One object of my invention is to provide a system, including a series motor, with electromagnetic switches and means for operating the same so connected that before current can be applied to the motor to reverse the direction of rotation of its armature said motor will be automatically caused to act as a generator, and thereby made to exert a braking force upon said armature and on the mechanism connected thereto.

Another object of the invention is to provide a system for controlling the operation of a series motor by which after current has been cut off from the motor it is automatically caused to build up as a generator, its armature being brought to a standstill before current can be applied to reverse the direction of rotation of said armature. I also desire to provide a system for use with a series motor which shall include a reversing-controller and electromagnetic switches so connected that between the time when current is cut off from the motor and again applied to reverse the rotation of the armature certain connections are made whereby the current generated by said armature is caused to flow through the field-winding in the same direction as during the operation of the machine as a motor, thereby causing it to build up and quickly come to rest by reason of the braking action caused by its generation of current.

An additional object of my invention is to provide a system, including a series motor, a reversing-controller, and electromagnetic switches connected to accelerate, brake, and reverse said motor, with interlocking means for preventing the switch or switches connecting the motor to the supply-mains being closed at the same time as the switch or switches for short-circuiting the motor.

These objects, together with other advantageous results, I attain as hereinafter set forth, reference being had to the accompanying drawings, in which—

Figure 1 is a diagrammatic view illustrating the connections between a series motor, a number of electromagnetic switches, and a reversing-controller, all arranged according to my invention. Figs. 2 and 3 are diagrammatic views illustrating slightly-modified arrangements of the short-circuiting switch and the means for operating the same. Fig. 4 is a diagrammatic view illustrating a system for operating a series motor according to my invention in which a hand-operated controller governs the actions of the switches for accelerating and reversing said motor, and Fig. 5 is a diagrammatic view illustrating a special form of controller with a slightly-different arrangement of switches employed in connection with two series motors.

As described in my application for United States Patent, Serial No. 199,123, filed March 21, 1904, it is a comparatively simple matter to operate a shunt-wound motor in a system including a reversing-controller and a series of automatic switches so as to cause the motor to automatically build up as a generator after the current from the mains has been cut off. For this purpose it is only necessary to short-circuit the armature through a suitable current-limiting resistance, since, owing to the fact that the field-winding of the motor is always energized, there is nothing to prevent such action. When, however, it is desired to similarly operate a series-wound motor, the problem is much more complex, since it becomes necessary not only to short-circuit the armature independently of the supply-mains, but also to provide means for causing the current generated by the motor to flow through the field-winding in a certain definite direction. If this be not done, the motor will not act as a generator, since the flow of current through its field-winding would not be in the right direction to cause the field to be built up from the residual magnetism of the field.

Referring to Fig. 1 of the above drawings, A is the armature of a motor whose series field is indicated at F, said armature having its terminals connected, respectively, to segments $c$ and $c'$ of the controller C, while one of the field-terminals is connected to two other segments, $c^2$. Two additional segments $c^3$ of the controller are connected to each other and to one end of a bank of resistance R, whose opposite end is connected to a coil $s$ for engaging the plunger of an electromagnetic switch S, the second end of this coil being attached to the second end of the series field-winding.

B is a double-pole main controlling-switch having one of its terminals connected to a pair of segments $c^4$ of the controller and to one terminal of the switch S, and in addition to the above there are two electrically-connected segments $c^5$ on the controller C, which has a contact-arm $c^7$, provided with brushes at its ends, as illustrated in the figures. The second terminal of switch S is in connection with the wire joining the bank of resistance R and the segments $c^3$, while the second pole of the switch B is connected to one terminal of a second electromagnetic switch S'. This latter switch, as well as each of three other switches, S$^2$, S$^3$, and S$^4$, has one terminal connected to different points of a bank of resistance R', while the second terminals of switches S$^2$, S$^3$, and S$^4$ are connected together and to the end of said resistance where it is connected to the terminal of the switch S'. The opposite end of the bank of resistance is connected to the field-winding F. A coil $s'$ for closing the switch S' has one end connected to the positive pole of the switch B and its opposite end connected to two segments $c^5$ on the controller, while the coils $s^2$, $s^3$, and $s^4$ of the remaining switches each have one terminal connected to different points of the resistance R' and their terminals connected together and to the segments $c^5$ of the controller. The preferred arrangement of the switches S' to S$^4$ and the connections of their respective coils is further described and claimed in an application for patent filed by me on June 4, 1904, Serial No. 211,210.

Under operating conditions if the main switch B be closed and the pivoted operating-arm $c^7$ be moved from its vertical or "off" position to the position indicated in dotted lines 1 1 current will flow from the positive supply-main, through coil $s'$ of switch S', through one of the segments $c^5$ and arm $c^7$, to segment $c^4$, from whence it will pass to the negative pole of the switch B. This energization of said coil will cause the switch S' to close, so that current is supplied to the motor through the bank of resistance R', field-winding F, segment $c^2$, arm $c^7$, segment $c'$, armature A, segment $c$, arm $c^7$, segment $c^4$ to the negative pole of the switch B. As the motor gradually speeds up the various sections of the resistance R' are successively cut out by the automatic closing of switches S$^2$, S$^3$, and S$^4$, as clearly described in my above-noted application for patent, until when the last of these switches is finally closed the motor will be operating at full speed. If now the arm $c^7$ be turned on its pivot toward its off position, it will by moving out of contact with segment $c^5$ cut off the current from the coils of all the switches, thereby causing them to open, and thus cutting off the current from the motor. As said arm $c^7$ is further moved toward its off position, so as to come into contact with the segment $c^3$, it will be seen that there is established a closed circuit through the motor, there being continuous electrical connections from one terminal of the armature A to the segment $c'$, arm $c^7$, segment $c^2$, field-winding F, coil $s$ of the switch S, resistance R, segment $c^3$, arm $c^7$, segment $c$, and back to the armature. In spite of this fact the motor will not build up as a generator, since the residual magnetism of the field tends to cause current-flow in a direction opposite to that described, and consequently the motor will continue to run under its own momentum. As the arm $c^7$ is moved past its off position and finally brought into contact with segments $c^2$, $c$, $c'$, $c^4$, and $c^3$ a second circuit is established from the armature A to the segment $c'$, arm $c^7$, segment $c^3$, resistance R, coil $s$, field-winding F, segment $c^2$, arm $c^7$, and back to the armature. It will be seen that with these connections the electromotive force generated by the armature tends to force current through the field in such a direction as to cause this to build up, so that the motor almost instantly generates current, which energizes coil $s$ and causes the switch S to close. The flow of current on such a short circuit is limited by the resistance of the bank R, and even though the arm $c^7$ be moved so as to pass off of segment $c^3$ the coil $s$ will still remain energized, since current generated by the armature continues to flow to segment $c'$, arm $c^7$, segment $c^4$, through switch S, resistance R, coil $s$, field-winding F, segment $c^2$, arm $c^7$, segment $c$ back to the armature. Should the arm $c^7$ be moved into contact with the segment $c^5$ while the motor is acting as a generator, and thereby again permit current to flow through the coil $s'$ of switch S', this latter cannot close, since the locking-bar T prevents both switches S and S' being closed at the same time. As a consequence current generated by the motor continues to retard its operation until it is finally brought to rest, when the switch S automatically opens on account of the cessation of current-flow through its coil $s$. Since the coil $s'$ of the switch S' is, as above noted, already energized, said switch will immediately close and again supply current to the motor, although this time the direction of the current through the armature will be the reverse of that when the arm $c^7$ was in the position indicated at 1 1. As said arm is moved from the position indicated at 2 2 back to the position indicated at 1 1 the above-described cycle of operations is repeated, the motor again being built up as a generator and brought to rest before current can be applied to it to move it in a reverse direction.

In Fig. 2 is illustrated a slightly-different arrangement of apparatus for accomplishing the same end as that secured by the apparatus in Fig. 1. In this case the electromagnetic switch S is provided with two coils or solenoids $s^{20}$ and $s^{21}$, of which the former has one end connected to the positive pole of the switch B, while its opposite end is connected to the segments $c^3$ of the controller C. The coil $s^{21}$, like coil $s$, is connected to one end of the field-winding and to the bank of resistance R, and the opposite end of said resistance is connected to one terminal of the switch S. The second terminal of this switch is connected to the negative terminal of switch B and to the two segments $c^4$ on the controller C. The remaining connections of this particular modification of my system are similar to those shown in Fig. 1. In operation, however, when the switches S' to S$^4$, inclusive, have been opened by the movement of the operating-arm off of the segment $c^5$ the engagement of said arm with segment $c^3$ permits current from the supply-mains to energize the coil $s^{20}$ and immediately close the switch S. As in the case illustrated in Fig. 1, this completion of the electric circuit of the motor independently of the supply-mains does not result in a flow of current, and switch S shortly thereafter opens on account of the movement of the arm $c^7$ off of the segment $c^3$. As, however, the continued motion of said arm brings its opposite end into engagement with the second segment $c^3$ the switch S is again closed, and this time the motor immediately builds up as a generator. Since this causes current to flow through coil $s^{21}$, the switch will still remain closed, even though the arm $c^7$ passes off of segment $c^3$ and onto segment $c^5$. This closed condition of the switch will continue until the armature has been brought to a standstill, when, as in the first case described, the coil $s'$ of switch S', which was energized through controller-segment $c^5$, causes said switch to close.

In the arrangement shown in Fig. 3, coil $s^{20}$ of switch S is connected as in Fig. 2, while coil $s^{21}$ has one end connected to the two segments $c^2$, which are also connected to one end of the field-winding F. The second end of said coil is connected to the line connecting the two segments $c^4$, the negative supply-main, and the bank of resistance R, while the opposite end of said resistance is in connection with one terminal of switch S. The second terminal of this switch is connected to the second terminal of the field-winding.

Where in Fig. 2 coil $s^{20}$, resistance R, switch S, and field-winding F are in series, the said coil in Fig. 3 is in shunt to the resistance and the field-winding. In either case the switch S is first closed by the energization of coil $s^{20}$ from the line-current and is afterward held closed by the current generated by the motor, even after the coil $s'$ of the switch S' has become energized.

In Fig. 4 instead of carrying the terminals of the main switch, armature, and field-winding through a hand-operated controller I connect them to suitable electromagnetic switches and provide a controller for energizing these switches in proper combinations to accelerate, reverse, and brake the motor. In addition to switches S to S$^4$, inclusive, I provide four switches S$^5$, S$^6$, S$^7$, and S$^8$ for reversing the relative connections of the field and armature of the motor and also two main current-controlling switches S$^9$ and S$^{10}$. To govern the operation of these switches, I provide a controller D, having contact-fingers $d$ $d'$ to $d^8$ and provided with a barrel (which is shown as developed in Fig. 4) on which are two sets of segments suitably placed to engage said fingers. All of the segments of each set are in electrical connection with each other, and the finger $d^8$ is connected to the positive pole of the main switch B. If now the barrel of the controller D be turned so as to bring the group of segments $d^9$ successively into engagement with the contact-fingers, it will be seen that the switches S$^6$ and S$^8$ will be closed, as will also switch S, by the supplying of current to their respective coils $s^6$, $s^8$, and $s^{20}$. Since, however, the motor is at rest, this closing of switch S has no effect, and its coil is deënergized just before finger $d^3$ is supplied with current by the continued movement of the controller-barrel. Such engagement of said fingers with its particular segment results in the closing of switches S$^9$ and S$^{10}$, so that current flows to the motor from the positive supply-main through switch S$^{10}$, resistance R$^2$, field-winding F, switch S$^6$, armature A, and switches S$^8$ and S$^9$ to the negative supply-main. As the barrel of the controller is still further turned and the motor speeds up the switches S', S$^2$, S$^3$, and S$^4$ successively close, the motor being operated at any desired speed by simply stopping the movement of the controller-barrel, so that any desired amount of the resistance R$^2$ is retained in circuit owing to the non-closure of certain of the switches. As the controller-barrel is revolved to its off position all of the switches which have been closed will be permitted to open, and though the armature of the motor be revolving the closure of switch S by the energization of its coil $s^{20}$ will not result in the motor building up, for the reason given in connection with the first-described arrangement of my system. As, however, the controller-barrel is revolved to and beyond its off position switches S$^6$ and S$^8$ open and switches S$^5$ and S$^7$ close, as does also the switch S. With these connections current is generated by the armature and flows through switches S$^7$ and S, coil $s^{21}$ of said switch S, resistance R$^2$, field-winding F, switch S$^5$, and back to the armature A. Even though the revolution of the controller-barrel be continued so as to cut off current from the coil $s^{20}$ and thereafter successively bring the remainder of the segments $d^{10}$ into engagement with their respective fingers the switch S will remain closed owing to the energization of its coil $s^{21}$ by the current from the motor. The fact that this switch remains closed prevents the closure of switches $S^9$ and $S^{10}$, for though their coils $s^9$ and $s^{10}$ are supplied with current a pair of locking-bars $t$ and $t'$ respectively engage the blades of said switches and hold them open as long as the opposite ends of said bars are engaged by the blade of the closed switch S. When the motor has finally come to rest, current no longer flows through coil $s^{21}$, and consequently switch S opens, thereby immediately allowing the two switches $S^9$ and $S^{10}$ to close. Since, as above noted, switches $S^5$ and $S^7$ were previously closed, current will now flow so as to turn the motor in a direction opposite to that first described. The movement of the controller-barrel to and beyond its off position will cause a repetition of the above-described cycle of operations. To prevent the possibility of the two sets of reversing-switches being closed at the same time, I provide locking-bars $t^2$ and $t^3$, respectively, between switches $S^5$ and $S^6$ and $S^7$ and $S^8$, it being understood that any other desired equivalent device may be employed to attain this end.

In the arrangement of my invention shown in Fig. 5 I have shown my system as including two motors whose armatures $A'$ and $A^2$ are connected in multiple, as are also their field-windings $F'$ and $F^2$, there being double pole-knife switches E and $E'$, whereby either of the motors may be cut out of service without interfering with the operation of the other. The electromagnetic reversing and accelerating switches are shown as connected in the same manner as are the switches in Fig. 4, with the exception that switch S has but a single coil whose ends are connected, respectively, to leads in connection with the armature-terminals of the motor or motors. In place of governing the supply of current to the coils of the switches by means of a controller of the drum type I have shown the system as operated from a double-faced controller $G^2$, provided with contact-segments and a contact-arm on each face, the connections being such that when said contact-arm is moved in one direction from its vertical or off position the coils of the switches are actuated by the segments of one controller-face to operate the motor in a given direction, while when the contact-arm is moved in the opposite direction from the off position the contact-segments on the opposite face of the controller permit current to flow to the coils of certain other switches, so as to accelerate the motor in the opposite direction. The operation of this last form of my system of motor-control will be understood from the descriptions of the operation noted in connection with Figs. 1 to 4, inclusive, since the two motors illustrated operate as one machine and have the respective terminals of their fields and armatures so connected as to cause them to build up as generators after current from the supply-mains has been cut off and while their armatures are still rotating under their own momentum. With the rigidly-connected arms of the controller $G^2$ in the positions shown the coils of the switches $S^5$, $S^7$, $S^9$, and $S^{10}$ would be energized and said switches closed, thereby permitting current to flow from the supply-mains through the motors, which are connected with their armatures and fields in multiple. The switches $S'$, $S^2$, and $S^3$ will be automatically and successively closed in the manner previously noted, thereby causing the motors to operate at full speed, while in addition it will be seen that the coils 2 and 4 of switches $S^6$ and $S^8$ are energized by the counter electromotive force of the motors, though said switches are kept from closing by the locking-bars $t^2$ and $t^3$. As soon, therefore, as the controller-arms are moved so that the arm $g^2$ passes off the segment $g^4$ coils 1, 3, 5, and 7 are deënergized, so that their respective switches open, and immediately thereafter switches $S^6$, $S^8$, and S close. This completes the circuit of the motors through resistance $R'$ independently of the supply-mains and owing to the braking action set up quickly brings said motors to rest. The continued movement of the controller-arms $g^2$ and $g^3$ toward a vertical position causes the coils of switches $S^5$ and $S^7$ to be energized by the counter electromotive force of the motors, though there is no action of said switches because of the locking-bars $t^2$ and $t^3$. As the controller-arms are moved past their vertical or off positions the coils of the switches $S^6$ and $S^8$ are disconnected from the armatures of the motors and immediately thereafter connected to the supply-mains by the engagement of the arm $g^3$ with segments $g^6$ and $g^7$. When the armatures of the motors no longer rotate, switch S opens, thus allowing switches $S^9$ and $S^{10}$ to close as soon as the further movement of the controller-arms causes segment $g^5$ to be supplied with current, and thereby cause the operation of the motors in a direction opposite to that first noted. Again, moving the controller-arms toward and beyond their off positions causes the above cycle of operations to be repeated.

I claim as my invention—

1. A system including a series motor, means for reversing said motor, and means for automatically causing the energy of the moving parts of the motor to be absorbed before said reversing means acts to change the direction of rotation of said motor, substantially as described.

2. A system including a series motor, means for reversing the same, with an automatic switch or switches mechanically independent of said reversing means for connecting the elements of said motor so that it will build up as a generator after current from a source of supply has been cut off, substantially as described.

3. The combination of a series motor, a reversing-controller, an automatic switch or switches connected to short-circuit the motor and means for connecting the elements of said motor so that it will build up as a generator, substantially as described.

4. The combination of a series motor, a reversing switch or switches, and a switch for short-circuiting the motor, there being a coil for said switch connected to be energized by current generated by said motor, substantially as described.

5. The combination of a series motor, a reversing switch or switches, and a switch for short-circuiting the motor, with a controller connected to govern the operation of said reversing switch or switches, substantially as described.

6. The combination of a series motor, a reversing switch or switches, and a switch for short-circuiting the motor, there being a coil for said switch connected to be energized by current generated by said motor, and a second coil also for the short-circuiting switch connected to be energized from current-supply mains, substantially as described.

7. The combination of a series motor, a reversing-switch and means for short-circuiting the motor with the relative connections of its armature and the field-winding reversed each time and before the motor is reversed, substantially as described.

8. The combination of a series motor, means for reversing the same, a switch for short-circuiting said motor, a coil for the short-circuiting switch connected to be energized by the current generated by the motor, and a switch for connecting said motor to a supply-main, substantially as described.

9. The combination of a series motor, means for reversing the same, a switch for short-circuiting said motor, a coil for the short-circuiting switch connected to be energized by the current generated by the motor, and a switch for connecting said motor to a supply-main, with means for preventing both of said switches being closed at the same time, substantially as described.

10. The combination of a series motor, a reversing-switch for the same, a switch for short-circuiting the motor and a switch for connecting the motor to a supply-main, means for connecting the members of the motor so that it will build up as a generator and means for preventing the current-supply switch being closed until the short-circuiting switch has been opened, substantially as described.

11. The combination of a series motor, reversing means therefor, a bank of resistance, means including an electromagnetic switch for short-circuiting the armature and field of the motor through said resistance between successive reversals of the motor, and means for rendering said switch inoperative during normal operations of the motor, substantially as described.

12. The combination of a series motor, a switch for short-circuiting the same, a reversing-switch including contacts connected to the short-circuiting switch, with means excited by current generated by the motor for causing said latter switch to operate, substantially as described.

13. A series motor, a switch for short-circuiting upon themselves the field and armature of said motor, and means for reversing the motor including two sets of contacts for causing the short-circuiting switch to be actuated before current is applied to reverse it, substantially as described.

14. The combination of a series motor, reversing mechanism, a switch for short-circuiting the motor and a switch or switches for accelerating the motor, a coil in circuit with the motor and placed to act on the short-circuiting switch, with controlling mechanism connected to twice complete a circuit through the motor and the coil between successive operations of the reversing mechanism, substantially as described.

15. The combination of a series motor, reversing mechanism, a switch for short-circuiting the motor and a switch or switches for accelerating the motor, with controlling mechanism connected to twice complete a circuit through the motor between successive operations of the reversing mechanism, substantially as described.

16. The combination of a series motor, an electromagnetic switch or switches for connecting the same to current-supply mains, a second electromagnetic switch for short-circuiting the motor independently of said supply-mains, and a switch for connecting the armature to the field of the motor so that said motor will be caused to build up as a generator, substantially as described.

17. A system including a series motor, a bank of resistance, a plurality of automatic switches for cutting out said resistance, a reversing-switch and a switch for short-circuiting the motor independently of current-supply mains, with means for changing the relative connections of the field and armature of the motor so as to cause it to act as a generator between successive reversals, substantially as described.

18. A system including a series motor, a bank of resistance, a plurality of automatic switches for cutting out said resistance, means for reversing the motor and means for connecting it in a closed circuit independently of supply-mains, with means for changing the relative connections of the field and armature of the motor so as to cause it to build up as a generator before current is applied to operate it in a reverse direction, substantially as described.

19. A system including a series motor, a bank of resistance, a plurality of automatic switches for cutting out said resistance, means for reversing the motor and means for connecting it in a closed circuit independenly of supply-mains, with means for changing the relative connections of the field and armature of the motor so as to cause it to build up as a generator before current is applied to operate it in a reverse direction, and mechanism for preventing such application of current until the motor has come substantially to rest, substantially as described.

20. A controlling system for a series motor including a switch for connecting the motor in a closed circuit independently of current-supply mains, means for reversing the motor and two coils placed to act upon said switch, one of the same having means whereby it may be connected to the supply-mains and the other being connected to receive current generated by the motor, substantially as described.

21. A controlling system including a series motor, an automatic switch for short-circuiting the motor, an automatic switch for connecting the motor to supply-mains and a controller having contacts and brushes connected so as to cause operation of said first switch and then operation of the second switch as said controller is operated in either direction from its off position, substantially as described.

22. A controlling system including a series motor, an automatic switch for short-circuiting the motor, an automatic switch for connecting the motor to supply-mains and a controller having contacts and brushes connected so as to cause operation of said first switch and then operation of the second switch as the controller is operated in either direction from its off position, the relative connections of the armature and field of the motor caused by the operation of said first switch being different when the controller is operated in different directions from said off position, substantially as described.

23. A controlling system including a series motor and automatic switches for connecting said motor either to supply-mains or in a circuit independent of said mains, the latter of said switches having two coils, of which one is in series with it, with a reversing-controller including contacts for first energizing the second coil of said switch and then causing energization of the coils of the other switches, substantially as described.

In testimony whereof I have signed my name to this specification in the presence of two subscribing witnesses.

ARTHUR C. EASTWOOD.

Witnesses:
C. W. COMSTOCK,
J. E. WELLMAN.